US006920379B2

(12) United States Patent
Miyamoto

(10) Patent No.: US 6,920,379 B2
(45) Date of Patent: Jul. 19, 2005

(54) VEHICLE-ONBOARD DSRC APPARATUS

(75) Inventor: Taiyu Miyamoto, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/330,091

(22) Filed: Dec. 30, 2002

(65) Prior Publication Data

US 2004/0019412 A1 Jan. 29, 2004

(30) Foreign Application Priority Data

Jul. 26, 2002 (JP) .................................... 2002-218975

(51) Int. Cl.[7] .......................... G06F 17/00; G08B 21/00
(52) U.S. Cl. ............................................ 701/1; 340/5.6
(58) Field of Search .................. 701/1, 36; 340/825.06, 340/825.15, 5.6–5.61, 5.64, 5.65, 5.66

(56) References Cited

U.S. PATENT DOCUMENTS

2002/0080048 A1 * 6/2002 Choi .......................... 340/988

FOREIGN PATENT DOCUMENTS

| | | |
|---|---|---|
| DE | 44 46 646 | 6/1996 |
| EP | 0 759 600 | 2/1997 |
| JP | 2001-216543 | 8/2001 |
| JP | 2002-15342 | 1/2002 |

* cited by examiner

*Primary Examiner*—Thu V. Nguyen
(74) *Attorney, Agent, or Firm*—Burns, Doane, Swecker & Mathis

(57) ABSTRACT

In a vehicle-onboard dedicated short-range communication (DSRC) apparatus for the DSRC communication system, a command judgment unit of an electronic toll communication-security application module (ETC-SAM) judges the type of command included in a communication signal transmitted between a HOST and an IC card with user information held therein. A command control unit of the ETC-SAM controls whether the command is to be analyzed, according to a result of judgment by the command judgment unit. Therefore, it is possible to simplify a communication procedure and reduce a communication time.

6 Claims, 14 Drawing Sheets

VEHICLE-ONBOARD DSRC APPARATUS

BACKGROUND OF THE INVENTION

1) Field of the Invention

The present invention relates to a microcomputer. More particularly, this invention relates to a dedicated short-range communication apparatus (hereinafter referred to as "DSRC" apparatus) which is mounted on a vehicle such as a car used for control of an electronic toll collection system (hereinafter also referred to as "ETC" system) or the like for expressways.

2) Description of the Related Art

The ETC system is a system that makes it possible to automatically pay tolls through radio communications between an antenna installed in a tollgate and a vehicle-onboard device that is mounted on a vehicle, and to pass through the tollgate without stopping. This ETC system is a simple system such that only one ETC card and one vehicle-onboard device are required for use. Therefore, there are various movements to use this system for shopping in fast food shops, for entering and leaving control to and from a parking lot in a large amusement park or the like, and therefore future utilization modes are expected.

FIG. 13 is a block diagram showing a configuration example of a vehicle-onboard ETC device mounted on a vehicle side in the ETC system as one of the DSRC systems based on the conventional art. In this figure, a HOST 123 as an ETC processor performs radio communications by the dedicated short-range communication (DSRC) between the vehicle-onboard ETC device and a roadside system (not shown) installed on the roadway, via an antenna 122 and a DSRC 121, to thereby transmit or receive data to and from the roadside system (not shown).

An ETC-Secure Application Module (ETC-SAM) 124 provides functions necessary for collecting tolls and performs encryption/decryption of data. Further, the ETC-SAM 124 also carries out conversion of a signal form between a parallel I/F that is a communication interface with the HOST 123 and a serial I/F that is a communication interface with an IC card 131, i.e., serial-parallel conversion.

A human-machine interface (HMI) 125 provides an interface for communication between human and a machine. An IC card interface 126 is used for inserting an IC card 131, and provides an interface for performing communications between the IC card 131 and the ETC-SAM 124.

FIG. 14 is a sequence diagram showing a command processing sequence between the roadside system, the vehicle-onboard ETC device, and the IC card based on the conventional art. FIG. 15 is a flowchart showing a command response sequence of the ETC-SAM according to the conventional art. The flow of the command response between the roadside system and the IC card via the HOST and ETC-SAM will be explained with reference to FIG. 14 and FIG. 15.

A primitive command 151 is transmitted from the roadside system to the vehicle-onboard ETC device. At this time, in the vehicle-onboard ETC device, an ETC command 152 is transmitted from the HOST 123 to the ETC-SAM 124 for requesting processing on the IC card 131, and the ETC-SAM 124 receives this ETC command 152 (step S101). The ETC-SAM 124 analyzes the received ETC command 152 (step S102), and transmits an execution command 153 to the IC card 131 (step S103). The IC card 131 sends back the processing result to the ETC-SAM 124 by a response 154 (step S104). Lastly, the ETC-SAM 124 transmits the return result to the HOST 123 by a Notify command 155 (step S105), thereby communication between the roadside system and the IC card 131 is completed.

As described above, in the ETC system that is one example of the conventional DSRC system, the communication between the roadside system and the IC card is carried out in such a manner that the ETC-SAM always receives the ETC command from the HOST and analyzes the command, and therefore the ETC-SAM has to mediate between the roadside system and the IC card.

However, this ETC system has such a processing mode that even when the ETC system is used to execute various applications, the above-described ETC-SAM must be mediated. Therefore, there is a problem in that an application not requiring the function of the ETC-SAM cannot be executed using this ETC system, that is, this ETC system does not support multiple applications.

It can be considered to realize support for multiple applications by allowing the ETC-SAM to have a processing function supporting all commands (for example, commands of ETC specification or commands other than the ETC specification), in order to support the multiple applications. However, in this case, there is a problem in that the size of the program to be installed in the ETC-SAM becomes huge. Further, there is another problem in that it is not possible to simplify a communication procedure and shorten a communication time.

With the method of adding all command processing functions to the ETC-SAM, there are problems in that even if the support for the applications existing at present is possible, the support for a newly developed application may not be possible, or the program installed in the ETC-SAM must be rewritten every time when an application is developed.

SUMMARY OF THE INVENTION

It is an object of this invention to provide a vehicle-onboard DSRC apparatus capable of simplifying a procedure and shorten a communication time, while realizing the support for multiple applications.

The vehicle-onboard dedicated short-range communication (DSRC) apparatus according to one aspect of this invention, includes a DSRC processing unit that processes a radio communication signal transmitted by DSRC, and an electronic toll collection (ETC) processing unit that performs transactions of an ETC command and ETC data included in the radio communication signal communicated with the DSRC processing unit. The apparatus also includes a security module. The security module includes a security processing unit that includes an encryption/decryption unit for performing encryption/decryption of the ETC data included in a communication signal transmitted between the ETC processing unit and an IC card with user information held therein. The security module also includes a host interface for communication between the security processing unit and the ETC processing unit, and an IC card interface for communication between the security processing unit and the IC card. The security processing unit further includes a command judgment unit for judging a type of command included in a communication signal transmitted between the ETC processing unit and the IC card, and a command control unit for controlling whether the command is to be analyzed, according to a result of judgment by the command judgment unit.

The vehicle-onboard dedicated short-range communication (DSRC) apparatus according to another aspect of this invention, includes a DSRC processing unit that processes a radio communication signal transmitted by DSRC, and an electronic toll collection (ETC) processing unit that performs transactions of ETC commands and ETC data included in the radio communication signal communicated with the DSRC processing unit. The apparatus also includes a security module. The security module includes a security processing unit that includes an encryption/decryption unit for performing encryption/decryption of the ETC data included in a communication signal transmitted between the ETC processing unit and a first IC card with user information held therein. The security module also includes a host interface for communication between the security processing unit and the ETC processing unit, a first IC card interface for communication between the security processing unit and the first IC card, a second IC card interface for communication between the ETC processing unit and a second IC card, and a signal conversion unit connected between the second IC card interface and the host interface, for converting a signal form of a communication signal between the second IC card interface and the host interface. A first IC card slot is provided to insert the first IC card, and a second IC card slot is provided to insert the second IC card.

The vehicle-onboard dedicated short-range communication (DSRC) apparatus according to still another aspect of this invention, includes a DSRC processing unit that processes a radio communication signal transmitted by DSRC, and an electronic toll collection (ETC) processing unit that performs transactions of ETC commands and ETC data included in the radio communication signal communicated with the DSRC processing unit. The apparatus also includes a security module. The security module includes a security processing unit that includes an encryption/decryption unit for performing encryption/decryption of the ETC data included in a communication signal transmitted between the ETC processing unit and an IC card with user information held therein. The security module also includes a host interface for communication between the security processing unit and the ETC processing unit, a first IC card interface for communication between the security processing unit and the IC card, a second IC card interface for communication between the ETC processing unit and the IC card, and a signal conversion unit connected between the second IC card interface and the host interface, for converting a signal form of a communication signal between the second IC card interface and the host interface. An IC card slot is provided to insert the IC card, and a switch switches the IC card slot to either the first IC card interface or the second IC card interface.

The vehicle-onboard dedicated short-range communication (DSRC) apparatus according to still another aspect of this invention, includes a DSRC processing unit that processes a radio communication signal transmitted by DSRC, and an electronic toll collection (ETC) processing unit that performs transactions of ETC commands and ETC data included in the radio communication signal communicated with the DSRC processing unit. The apparatus also includes a security module. The security module includes a security processing unit that includes an encryption/decryption unit for performing encryption/decryption of the ETC data included in a communication signal transmitted between the ETC processing unit and a first IC card with user information held therein. The security module also includes a host interface for communication between the security processing unit and the ETC processing unit, and a first IC card interface for communication between the security processing unit and the first IC card. A first IC card slot is provided to insert the first IC card, and a second IC card slot is provided to insert a second IC card. The ETC processing unit includes a second IC card interface for communication with the second IC card.

These and other objects, features and advantages of the present invention are specifically set forth in or will become apparent from the following detailed descriptions of the invention when read in conjunction with the accompanying drawings.

DETAILED DESCRIPTION

Embodiments of the vehicle-onboard DSRC apparatus according to the present invention will now be explained in detail with reference to the drawings. However, this invention is by no means limited by the embodiments.

A first embodiment of this invention will be explained below.

Figure 1:
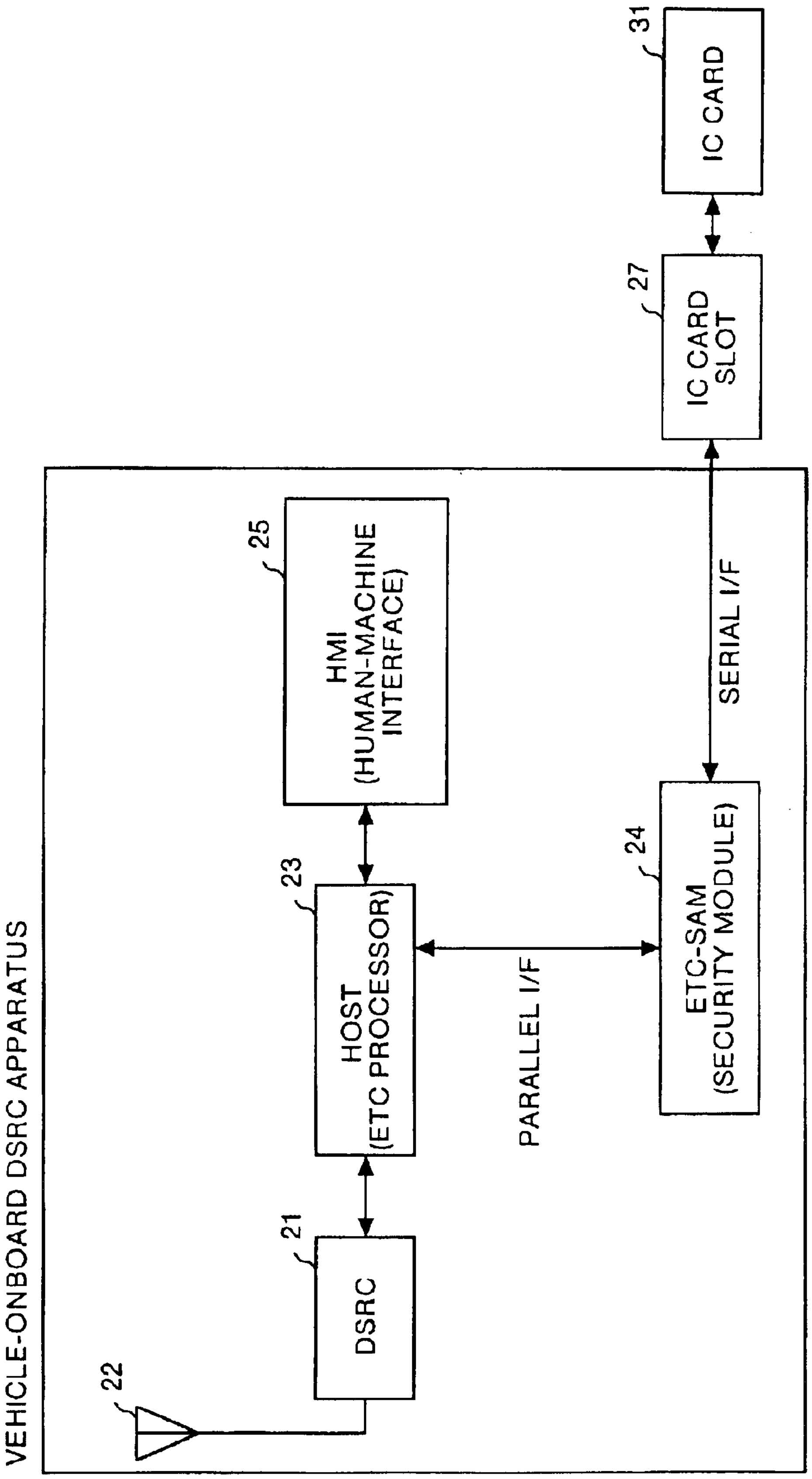
FIG. 1 is a block diagram showing a configuration example of a vehicle-onboard apparatus for a DSRC system (vehicle-onboard DSRC apparatus) in which the function of a conventional vehicle-onboard ETC device is extended, according to a first embodiment of this invention.

FIG. 1 is a block diagram showing a configuration example of a vehicle-onboard apparatus for a DSRC system (a vehicle-onboard DSRC apparatus) in which the function of a conventional vehicle-onboard ETC device is extended, according to a first embodiment. In this figure, a DSRC 21 performs radio communications by dedicated short-range communication (DSRC) between a vehicle-onboard ETC device and a roadside system installed on a roadside (not shown) via an antenna 22. A HOST 23, being an ETC processor, performs data transaction with the roadside system. An ETC-Secure Application Module (SAM) 24 is a security module that performs encryption/decryption of data. A human machine interface (HMI) 25 provides an interface for communication between human and a machine. An IC card 31 is inserted into an IC card slot 27. The ETC-SAM 24 carries out conversion of a signal form between a parallel I/F that is a communication interface with the HOST 23 and a serial I/F that is a communication interface with the IC card 31, that is, serial-parallel conversion.

Figure 2:
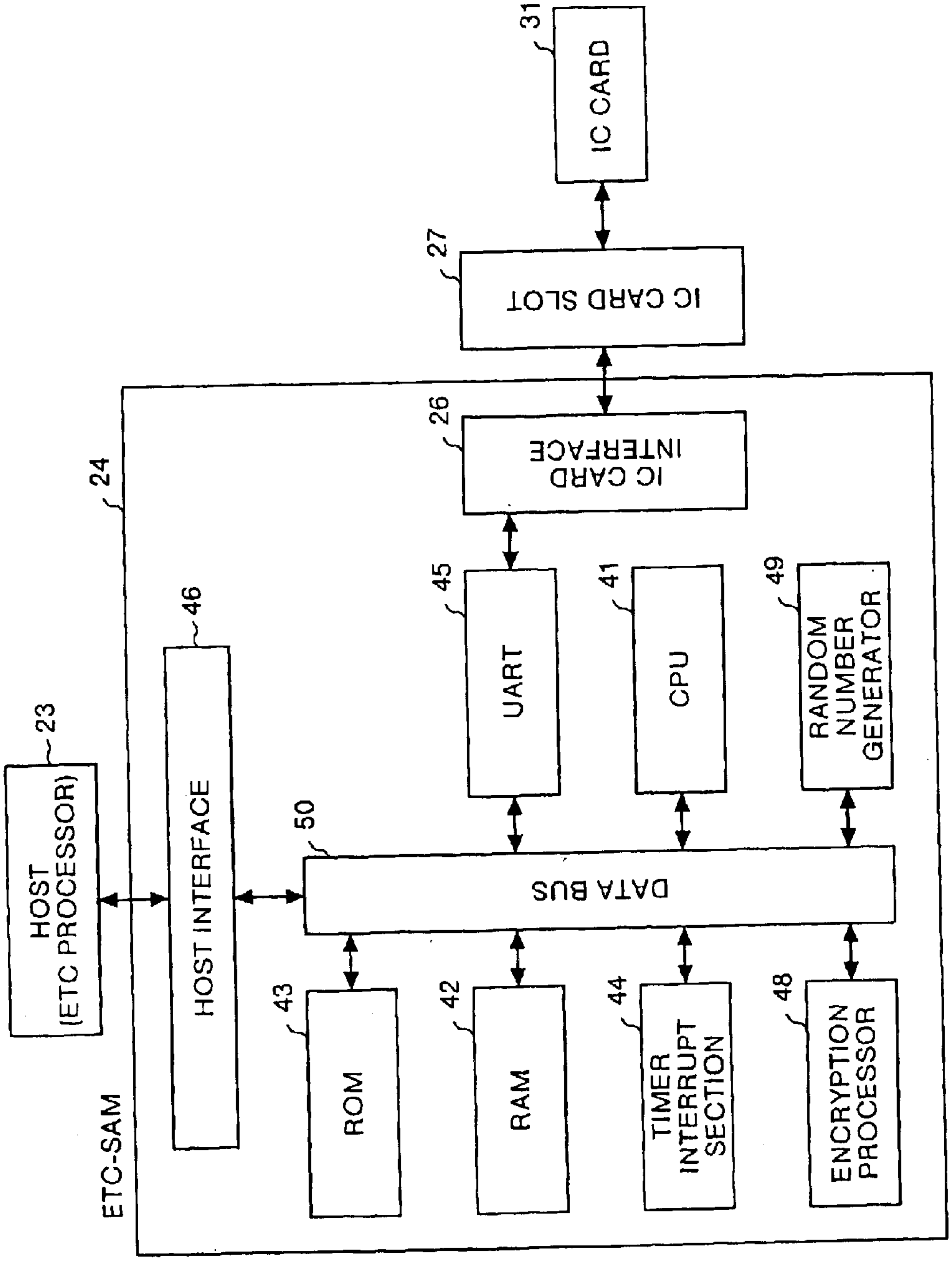
FIG. 2 is a block diagram showing a configuration example of an ETC-SAM that is a processor of the vehicle-onboard DSRC apparatus according to the first embodiment shown in FIG. 1.

FIG. 2 is a block diagram showing a configuration example of the ETC-SAM 24, being a processor of the vehicle-onboard DSRC apparatus, according to the first embodiment shown in FIG. 1. In FIG. 2, the ETC-SAM 24 comprises a CPU 41 being a general processor as a microcomputer, a RAM 42, a ROM 43, a timer interrupt section 44, and a universal asynchronous receiver-transmitter (UART) 45. The ETC-SAM 24 also comprises a HOST interface 46, an IC card interface 26, an encryption processor 48, and a random number generator 49, each of which is a specific processor to the ETC-SAM 24. The communication between the CPU 41, the RAM 42, the ROM 43, the timer interrupt section 44, the UART 45, the encryption processor 48, and the random number generator 49 with each other, or the communication with the HOST 23 via the HOST interface 46 is carried out through a data bus 50.

The ETC-SAM 24 performs authentication required for collecting tolls, encryption/decryption of data, and conversion of signal form between the parallel I/F being a communication interface with the HOST 23 and the serial I/F being a communication interface with the IC card 31, that is, serial-parallel conversion. The CPU 41 in the ETC-SAM 24 performs data transaction processing between the DSRC 21 and the IC card 31. With regard to the transaction of the DSRC 21, the CPU 41 operates in response to a dedicated command from the HOST 23, as a peripheral equipment (auxiliary equipment) connected to the HOST 23, to control storage and retention of data required for collecting tolls. With regard the transaction of the IC card 31, the CPU 41 instructs information update and addition in the IC card 31. The CPU 41 also controls the encryption processor 48 and the random number generator 49 to perform encryption, decryption, and authentication of data.

The HOST interface 46 performs interface control between the HOST 23 and the ETC-SAM 24. For the communication between the HOST interface 46 and the roadside system of the ETC, a 16-bit parallel bus is used. The encryption processor 48 performs encryption/decryption of data, upon reception of an instruction from the HOST 23. The random number generator 49 generates a random number required for a code. The IC card interface 26 performs communication control between the IC card 31 and the ETC-SAM 24. The basic processing such as detection of insertion or removal of the IC card 31, activation, deactivation, and write/read of the data is carried out in response to the instruction from the roadside system.

Figure 3:
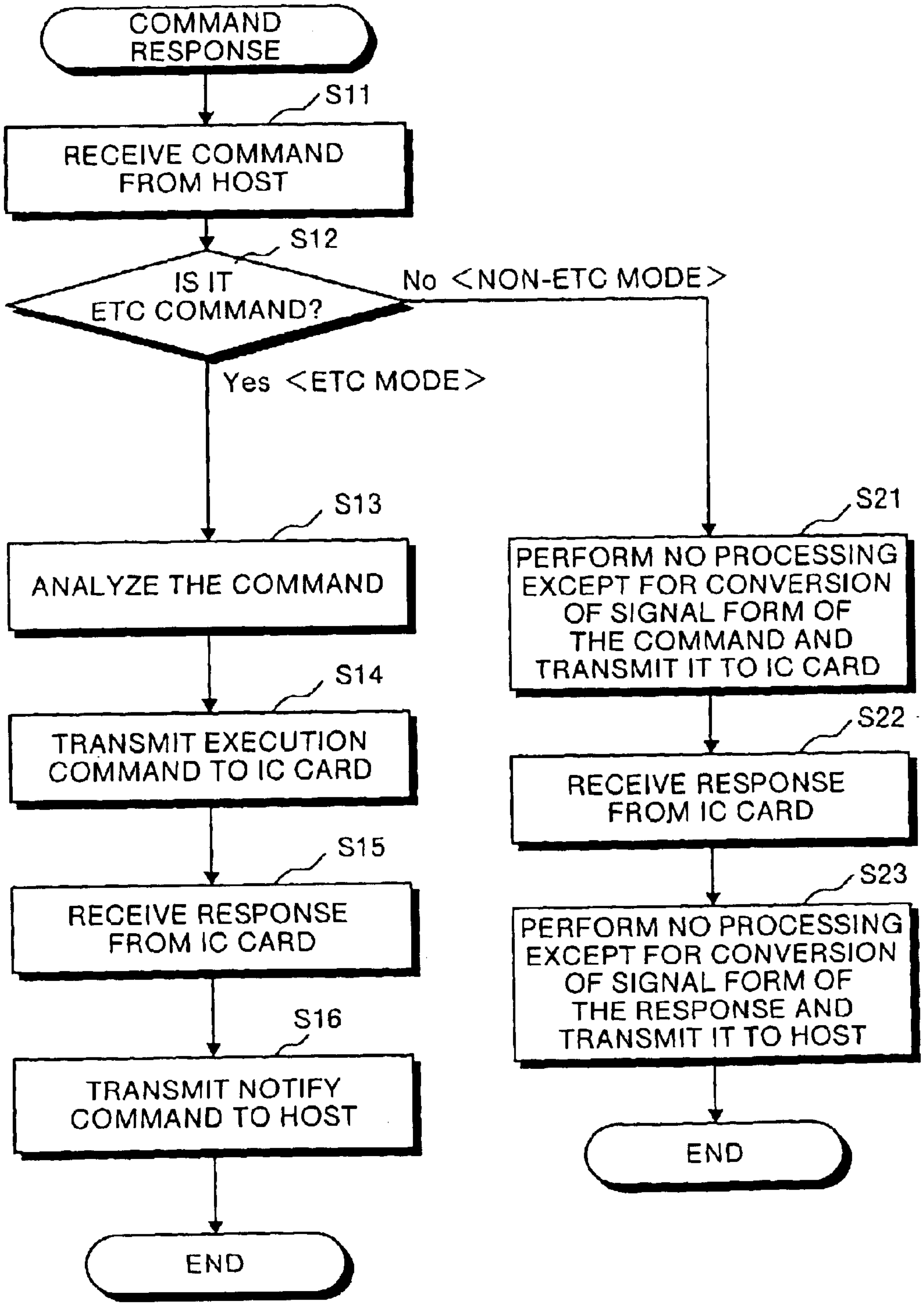
FIG. 3 is a flowchart showing a command response sequence of the ETC-SAM according to the first embodiment.
Figure 4:
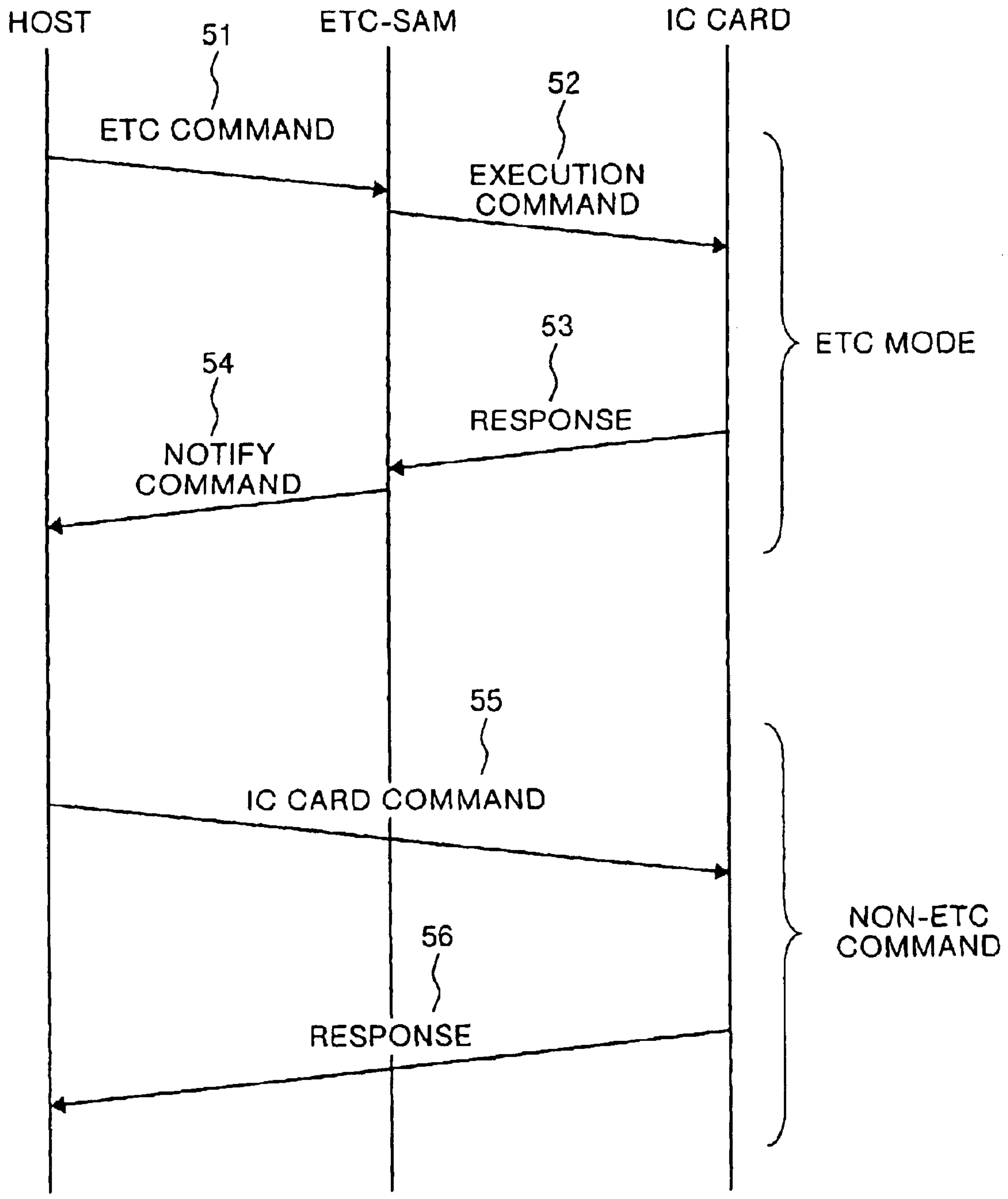
FIG. 4 is a sequence diagram showing a command processing sequence between a HOST, an ETC-SAM, and an IC card, in ETC mode and in non-ETC mode according to the first embodiment.

FIG. 3 is a flowchart showing a command response sequence of the ETC-SAM according to the first embodiment, and FIG. 4 is a sequence diagram showing a command processing sequence between the HOST, the ETC-SAM, and the IC card in ETC mode and in non-ETC mode, according to the first embodiment.

In FIG. 3 and FIG. 4, a command (an ETC command 51 or an IC card command 55 in the example shown in FIG. 4) is first transmitted from the HOST 23, and the ETC-SAM 24 receives this command (step S11). The ETC-SAM 24 judges whether the transmitted command is the ETC command 51 that is a command for controlling the ETC (step S12), and when it is judged that the command is the ETC command 51, the ETC-SAM 24 carries out the operation in the ETC mode. The operation in the ETC mode is the same as that explained in the conventional art. That is to say, the ETC-SAM 24 analyzes the ETC command 51 (step S13), and transmits an execution command 52 to the IC card 31 (step S14). The IC card 31 sends back the processing result to the ETC-SAM 24 by a response 53 (step S15). The ETC-SAM 24 transmits the return result to the HOST 23 by a Notify command 54 (step S16), thereby communication between the HOST 23 and the IC card 31 is completed.

When the ETC-SAM 24 receives an undefined command (the IC card command 55 in the example in FIG. 4) other than the ETC command, the operation in the non-ETC mode is to be performed. That is to say, the HOST 23 transmits the IC card command 55 to the ETC-SAM 24 (step S21). The ETC-SAM 24 performs no processing for the contents of the IC card command 55, but performs the conversion processing of the transmission format from a parallel signal to a serial signal, and transmits the IC card command 55 whose transmission format is converted, to the IC card 31. The IC card 31 sends back the processing result to the ETC-SAM 24 by a response 56 (step S22). The ETC-SAM 24 performs no processing for the contents of the IC card command 56 being the return result thereof, but performs the conversion processing from the serial signal to the parallel signal, and transmits the converted response 56 to the HOST 23 (step S23), thereby the communication between the HOST 23 and the IC card 31 is completed. The CPU 41 equipped in the ETC-SAM 24 makes judgment whether the command is the ETC command, and performs the control processing as to whether the command is to be analyzed.

According to the first embodiment, it is judged whether the command included in the communication signal transmitted between the HOST 23 and the IC card that holds user information is the ETC command. When it is judged that the command is not the ETC command but an undefined command, this undefined command is transmitted to the IC card 31 without analyzing the undefined command. Therefore, the communication procedure can be simplified, and the communication time can be shortened. Further, since a chip of the ETC-SAM 24 can be used in applications other than the ETC system, an application-independent DSRC system can be realized, and the market of the vehicle-onboard DSRC apparatus based on the vehicle-onboard ETC device can be expanded.

Further, according to the first embodiment, the application-independent vehicle-onboard DSRC apparatus can be realized by adding a unit having a simple configuration, and therefore the market expansion of the vehicle-onboard DSRC apparatus based on the vehicle-onboard ETC device can be realized more economically.

A second embodiment of this invention will be explained below.

The second embodiment has a feature in that the ETC-SAM 24 shown in FIG. 2 operates in the ETC mode and the non-ETC mode described in detail in the first embodiment, and that the non-ETC mode operates in a plurality of modes such as serial-parallel conversion mode and encryption/decryption mode. The configuration of the ETC-SAM 24 according to the second embodiment is the same as that of the ETC-SAM 24 shown in FIG. 2.

Figure 5:
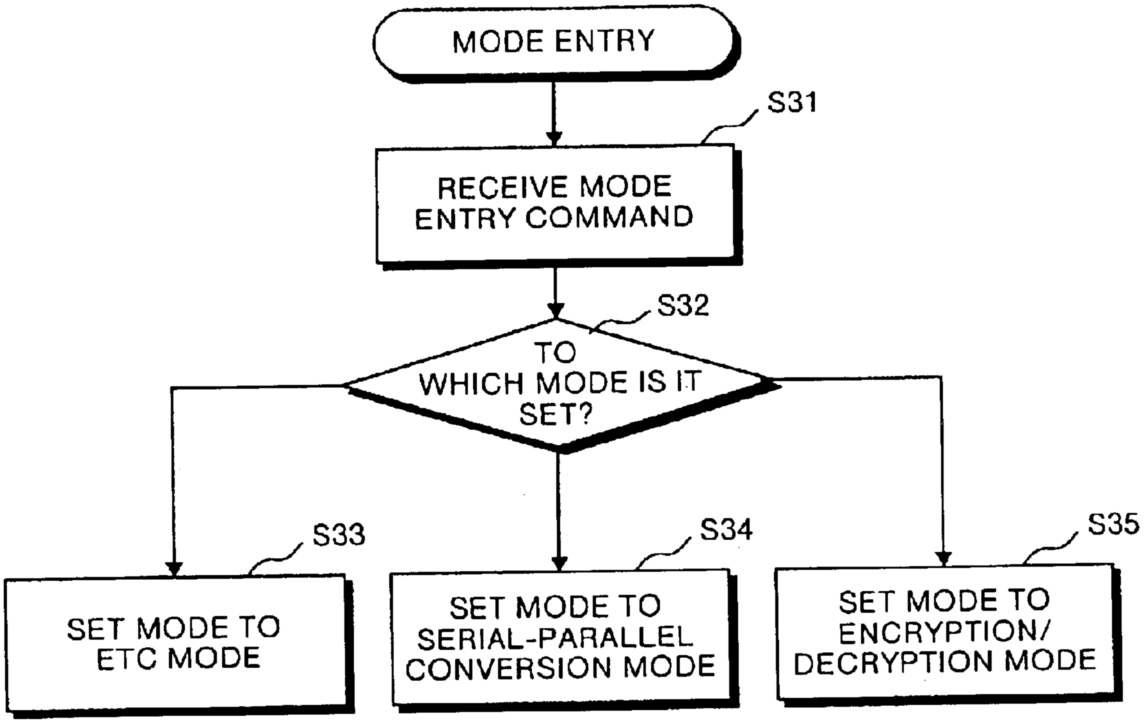
FIG. 5 is a flowchart showing a mode entry procedure of an ETC-SAM according to a second embodiment of this invention.
Figure 6:
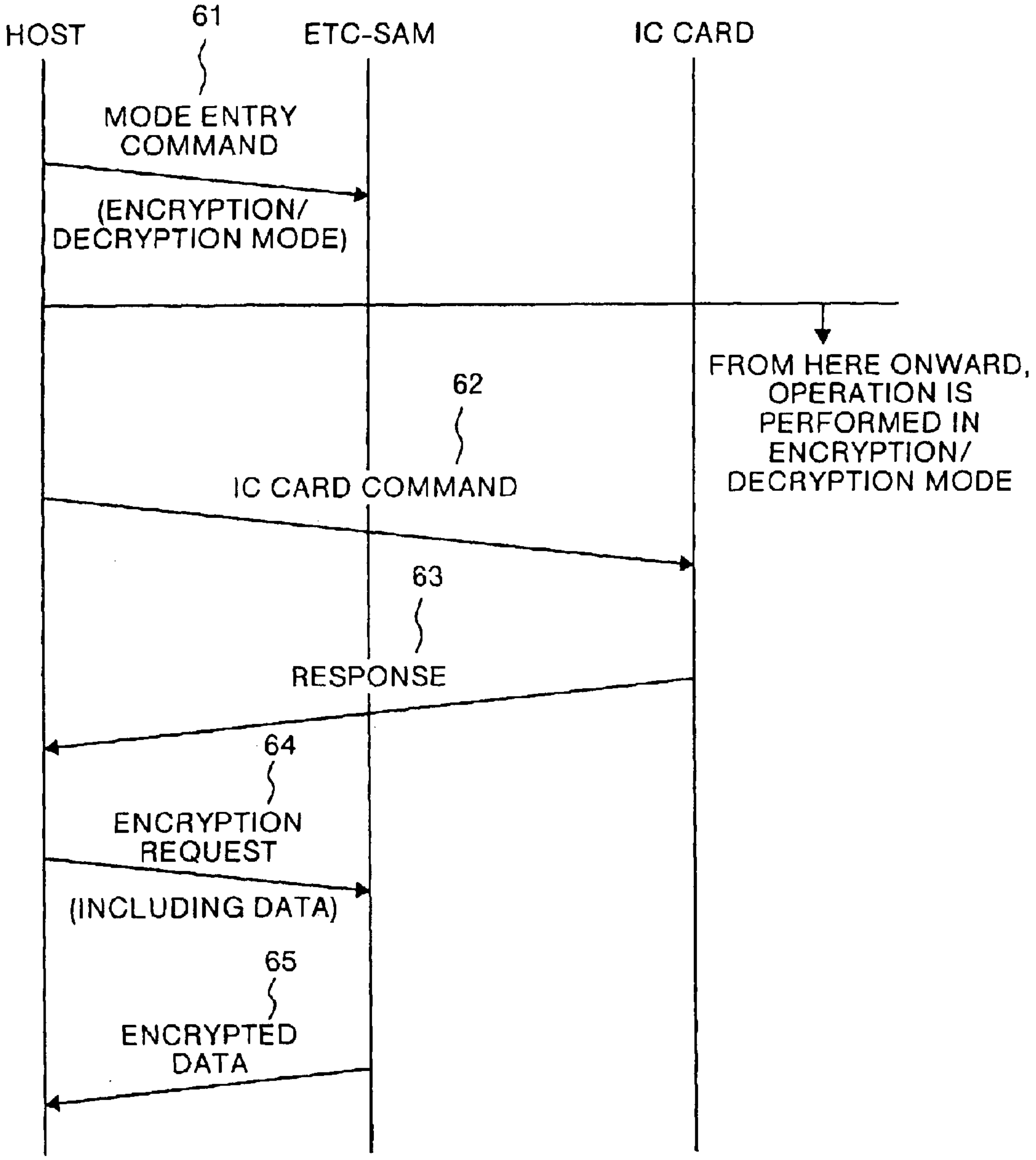
FIG. 6 is a sequence diagram showing a command processing sequence between the HOST, the ETC-SAM, and the IC card, in encryption/decryption mode according to the second embodiment.

FIG. 5 is a flowchart showing a mode entry procedure of the ETC-SAM according to the second embodiment. FIG. 6 is a sequence diagram showing a command processing sequence between the HOST, the ETC-SAM, and the IC card in the encryption/decryption mode according to the second embodiment.

In FIG. 5, a mode entry command is first transmitted from the HOST 23, and the ETC-SAM 24 receives this mode entry command (step S31). The ETC-SAM 24 confirms the transmitted mode entry command and judges to which mode the control is to shift (step S32). When the mode entry command is an instruction to shift to the ETC mode, the ETC-SAM 24 sets the mode to the ETC mode (step S33), and analyzes whether this command is a command for controlling the ETC as in the conventional art, to thereby determine whether the ETC-SAM 24 should involve in the command processing.

The non-ETC mode includes two modes, for example, the serial-parallel conversion mode (step S34) and the encryption/decryption mode (step S35). The serial-parallel conversion mode is a mode equivalent to the non-ETC mode in the first embodiment, in which the ETC-SAM 24 does not perform any processing for data communications between the HOST 23 and the IC card 31, but performs only the serial-parallel conversion of data. As shown in FIG. 6, the encryption/decryption mode is a mode in which the ETC-SAM 24 carries out encryption/decryption of data with respect to the encryption/decryption request of data from the HOST 23, and carries out only the serial-parallel conversion of data without any processing for the command to the IC card 31. After the ETC-SAM 24 is entered in any of the modes and a series of processing is finished, the ETC-SAM 24 performs the processing for returning to the ETC mode. The CPU 41 equipped in the ETC-SAM 24 performs control processing such as judgment of these commands, processing for the command, setting of the mode, and return of the mode.

The command sequence in the encryption/decryption mode will be explained below with reference to FIG. 6. A mode entry command 61 is transmitted from the HOST 23, and the ETC-SAM 24 judges that the transmitted mode entry command is a shift command to the encryption/decryption mode and sets the mode to the encryption/decryption mode. Thereafter, the operation in the encryption/decryption mode is carried out. Therefore, with respect to the IC card command 62 which is transmitted next, the ETC-SAM 24 carries out only the conversion processing of the transmission format from a parallel signal to a serial signal without performing any processing for the contents of the IC card command 62, and transmits the IC card command 62 whose transmission format is converted, to the IC card 31. The IC card 31 sends back the processing result to the ETC-SAM 24 by a response 63. The ETC-SAM 24 carries out the conversion processing from the serial signal to the parallel signal without performing any processing for the contents of the response 63 being the return result, and transmits the converted response 63 to the HOST 23.

The HOST 23 transmits an encryption request 64 including data to the ETC-SAM 24, in order to encrypt the contents of the response 63, transmitted from the IC card 31. The ETC-SAM 24 transmits the encrypted data 65 as the processing result of the encryption request 64, to the HOST 23. This encrypted data 65 is transmitted to a roadside system (not shown) via the DSRC 21. The decryption operation, which forms a pair with the encryption operation, is carried out in the same procedure. That is to say, transaction of the decryption request and the decrypted data is carried out between the HOST 23 and the ETC-SAM 24, and the decrypted data is transmitted from the HOST 23 to the IC card 31. At this time, the ETC-SAM 24 carries out only the conversion processing of the transmission format from a parallel signal to a serial signal.

As described above, according to the second embodiment, there are provided the ETC mode in which a command transmitted from the HOST 23 is analyzed and encryption/decryption of the ETC data is carried out between the HOST 23 and the IC card 31, based on the mode entry command transmitted from the HOST 23, and the non-ETC mode in which when the command transmitted from the HOST 23 is an undefined command, this undefined command is transmitted to the IC card 31 without being analyzed. Therefore, the communication procedure can be simplified, and the communication time can be shortened. Further, since a chip of the ETC-SAM 24 can be used in any application other than the ETC system, an application-independent DSRC system can be realized, and the market of the vehicle-onboard DSRC apparatus based on the vehicle-onboard ETC device can be expanded.

Further, according to the second embodiment, since the application-independent vehicle-onboard DSRC apparatus can be realized by adding a unit having a simple configuration, the market expansion of the vehicle-onboard DSRC apparatus based on the vehicle-onboard ETC device can be realized more economically.

A third embodiment of this invention will be explained below.

The third embodiment has a feature in that in the ETC-SAM 24 including a plurality of modes described in detail in the second embodiment (for example, the ETC mode, the encryption/decryption mode, and the serial-parallel conversion mode), the DSRC 21 and a roadside system (not shown) determine the mode of the ETC-SAM 24 by a frequency used for communication. The configuration of the ETC-SAM 24 according to the third embodiment is the same as that of the ETC-SAM 24 shown in FIG. 2.

Figure 7:
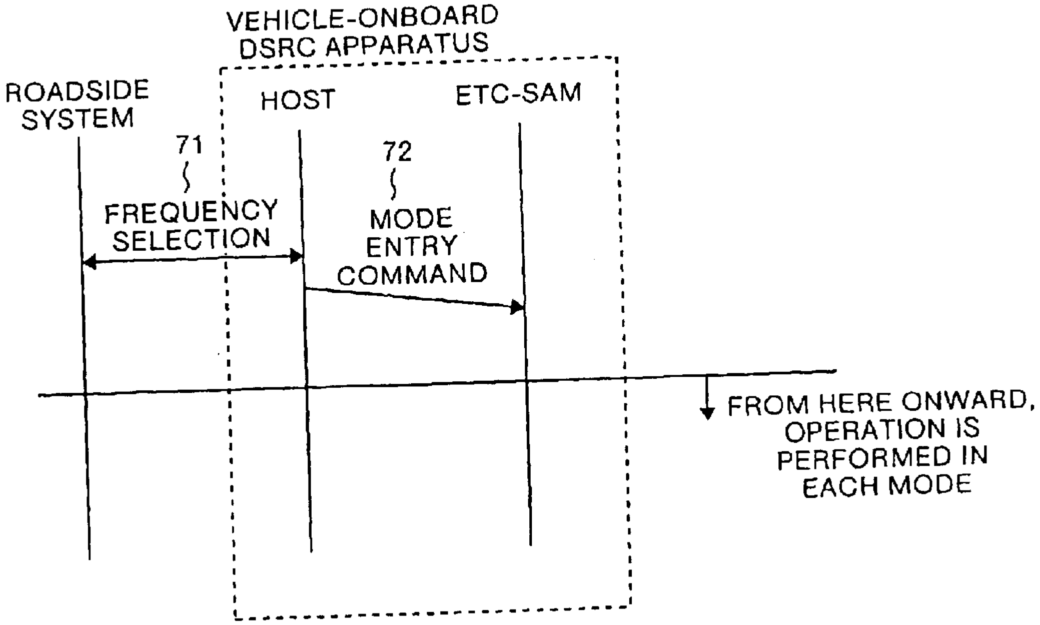
FIG. 7 is a sequence diagram showing a processing sequence of mode entry according to a third embodiment of this invention.

FIG. 7 is a sequence diagram showing a processing sequence of mode entry according to the third embodiment. In the DSRC system, a frequency band to be used is generally different depending on the application, and the application can be identified using this different frequency band. When the vehicle-onboard DSRC apparatus enters in the communication zone of the application, the HOST 23 performs data transaction relating to the frequency selection 71 with the roadside system (not shown). Thereafter, the HOST 23 transmits a mode entry command 72 for processing the application identified by the frequency band, to the ETC-SAM 24. The operation in each mode is the same as the contents explained in the second embodiment, and hence the explanation thereof is omitted. When the ETC-SAM 24 is entered in each of the modes and a series of processing is finished, the ETC-SAM 24 carries out the processing for returning to the ETC mode. The CPU 41 equipped in the ETC-SAM 24 performs control processing such as judgment of these commands, processing of the command, setting of the mode, and return of the mode, in the same manner as that in the second embodiment.

As described above, according to the third embodiment, the application is identified based on the frequency used in the mode dedicated short-range communication (DSRC), and a predetermined mode is set to execute the identified application in accordance with the mode entry command 72 transmitted from the ETC processing unit. Therefore, the chip of the ETC-SAM 24 can be used for a plurality of applications other than the ETC system, and hence, an application-independent DSRC system can be realized, and the market of the vehicle-onboard DSRC apparatus based on the vehicle-onboard ETC device can be expanded.

Further, according to the third embodiment, the application-independent vehicle-onboard DSRC apparatus can be realized by adding a unit having a simple configuration, and therefore the market expansion of the vehicle-onboard DSRC apparatus based on the vehicle-onboard ETC device can be realized more economically.

A fourth embodiment of this invention will be explained below.

The fourth embodiment has a feature in that in the ETC-SAM 24 comprising a plurality of modes described in detail in the second embodiment (for example, the. ETC mode, the encryption/decryption mode, and the serial-parallel conversion mode), the mode of the ETC-SAM 24 is determined by an IC card to be used. The configuration of the ETC-SAM 24 according to the fourth embodiment is the same as that of the ETC-SAM 24 shown in FIG. 2.

Figure 8:
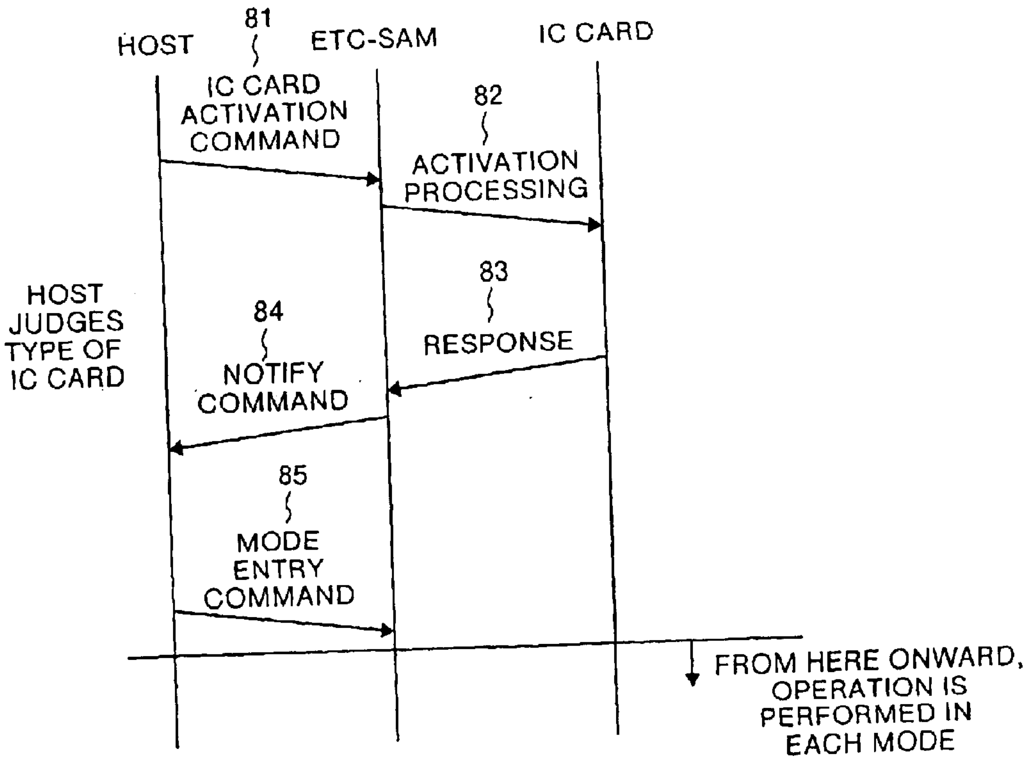
FIG. 8 is a sequence diagram showing a processing sequence of mode entry according to a fourth embodiment of this invention.

FIG. 8 is a sequence diagram showing a processing sequence of mode entry according to the fourth embodiment. In the DSRC system, the IC card 31 to be used is generally different depending on the application, and the application can be identified using this different IC card 31. If the IC card 31 is inserted in the vehicle-onboard DSRC apparatus, then the HOST 23 transmits an IC card activation command 81, being a local command, to the ETC-SAM 24. The ETC-SAM 24 analyzes the command to execute the activation processing 82 of the IC card to the IC card 31. The IC card 31 sends back a response 83, being the execution result, to the ETC-SAM 24, and the ETC-SAM 24 sends back the result to the HOST 23 by a Notify command 84. At this time, the HOST 23 can identify the type of the IC card 31 inserted in the vehicle-onboard DSRC apparatus.

After having identified the type of the IC card 31, the HOST 23 transmits a mode entry command 85 to the ETC-SAM 24. The operation in each mode is the same as the contents explained in the second embodiment, and hence the explanation thereof is omitted. When the ETC-SAM 24 is entered in each mode and a series of processing is finished, the ETC-SAM 24 carries out the processing for returning to the ETC mode. The CPU 41 equipped in the ETC-SAM 24 performs the control processing such as judgment of these commands, processing for the command, setting of the mode, and return of the mode, in the same manner as that in the second embodiment.

As described above, according to the fourth embodiment, it is detected whether the IC card has been activated, the IC card is identified based on a detected IC card activation signal, a predetermined mode is set to execute the processing to the IC card in accordance with the mode entry command transmitted from the ETC processing unit. Therefore, the chip of the ETC-SAM 24 can be used for a plurality of applications other than the ETC system, and therefore an application-independent DSRC system can be realized, and the market of the vehicle-onboard DSRC apparatus based on the vehicle-onboard ETC device can be expanded.

Further, according to the fourth embodiment, an application-independent vehicle-onboard DSRC apparatus can be realized by adding a unit having a simple configuration, and therefore the market expansion of the vehicle-onboard DSRC apparatus based on the vehicle-onboard ETC device can be realized more economically.

A fifth embodiment of this invention will be explained below.

Figure 9:
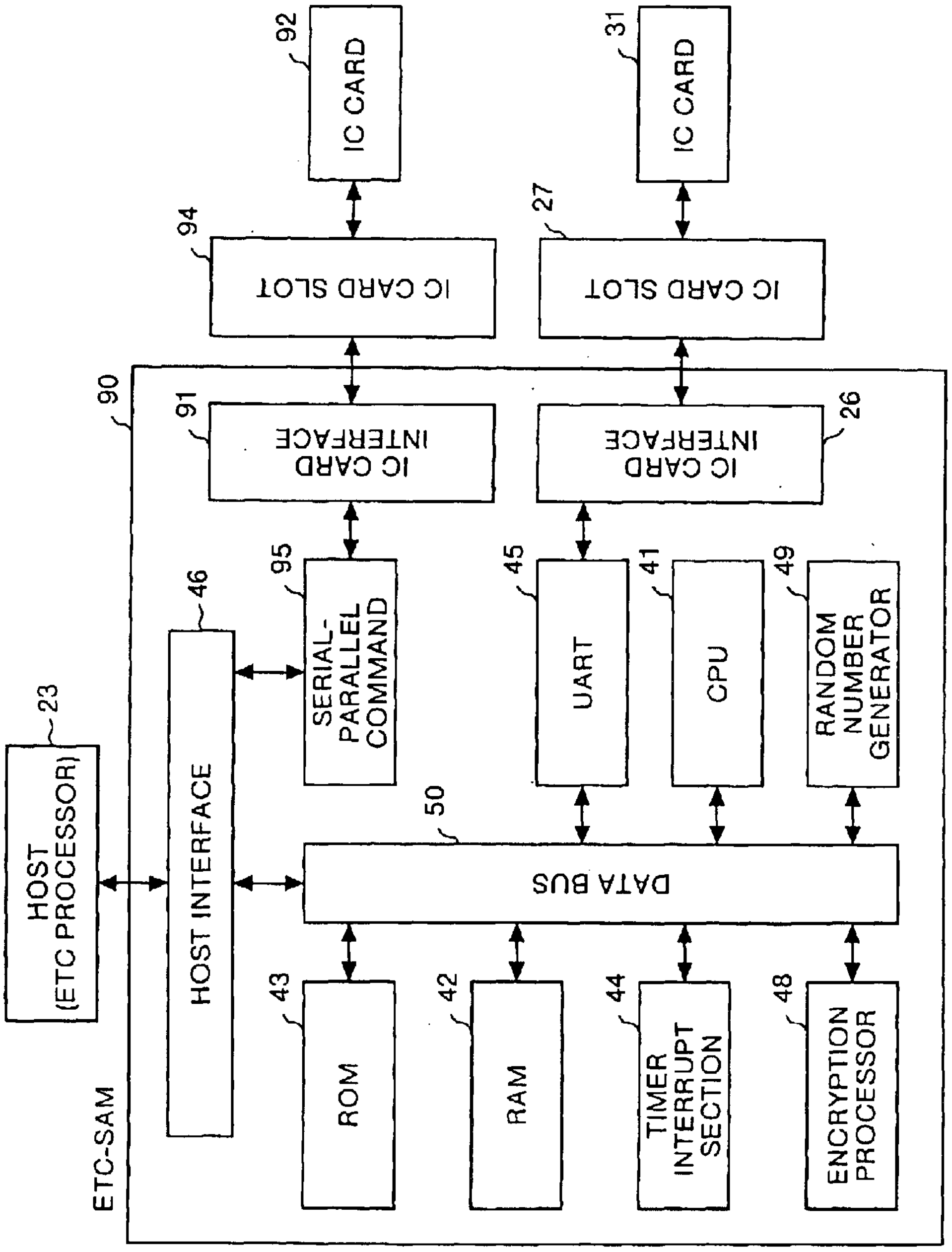
FIG. 9 is a block diagram showing a configuration example of an ETC-SAM according to a fifth embodiment of this invention.

FIG. 9 is a block diagram showing a configuration example of an ETC-SAM 90 according to the fifth embodiment. This embodiment is different from the first to fourth embodiments in that an IC card interface 91 is further provided in the ETC-SAM 24 shown in FIG. 2, and in that an IC card 92, an IC card slot 94, and a serial-parallel conversion circuit 95 are provided in the vehicle-onboard DSRC apparatus. The remaining of the configuration is the same as that of FIG. 2, and the same reference numerals are assigned to the same parts.

This fifth embodiment has a feature in that in the ETC-SAM 24 including a plurality of modes described in detail in the second embodiment (for example, the ETC mode, the encryption/decryption mode, and the serial-parallel conversion mode), the mode of the ETC-SAM 24 is determined by the IC card slot to be used.

In FIG. 9, the added IC card interface 91 is connected to the HOST interface 46 via a serial-parallel conversion circuit 95. The IC card 92 can be inserted into the IC card slot 94 added in the vehicle-onboard DSRC apparatus. As described above, by providing a plurality of IC card interfaces (two in this example) in the ETC-SAM 90, the IC card interface 26 can communicate with the HOST 23 through the conventional interface, and the IC card interface 91 can communicate with the HOST 23 via the serial-parallel conversion circuit 95 without using the function of the ETC-SAM 90. In this manner, the IC card slot 94 directly communicates with the HOST 23 via the HOST interface 46, and performs the operation without using the function of the ETC-SAM 90. The mode setting of the ETC-SAM 90 is performed by the entry command from the HOST 23 to the ETC-SAM 90 in the same manner as that in the second embodiment.

According to the fifth embodiment, there are provided the IC card interface 91 for communication between the HOST 23 and the IC card 92, the IC card slot 94 into which the IC card 92 is inserted, and the serial-parallel conversion circuit 95 that converts the signal form of a communication signal between the IC card interface 91 and the HOST interface 46. The IC card interface 91 is connected to the HOST interface 46 via the signal conversion unit. Hence, the chip of the ETC-SAM 90 can be used for a plurality of applications other than the ETC system. As a result, an application-independent DSRC system can be realized, and the market of the vehicle-onboard DSRC apparatus based on the vehicle-onboard ETC device can be expanded.

Further, according to the fifth embodiment, the application-independent vehicle-onboard DSRC apparatus can be realized by adding a unit having a simple configuration, and therefore the market expansion of the vehicle-onboard DSRC apparatus based on the vehicle-onboard ETC device can be realized more economically.

In this fifth embodiment, the example in which the IC card 92 directly communicates with the HOST 23 through the HOST interface 46 without using the ETC-SAM 90 is shown. However, it is also possible that not only one IC card but also a plurality of IC cards are provided and these IC cards communicate with the HOST 23 through the HOST interface 46. In this case, the IC cards-capable IC card slot, IC card interface, and serial-parallel conversion circuit are used and connected to the HOST interface.

A sixth embodiment of this invention will be explained below.

Figure 10:
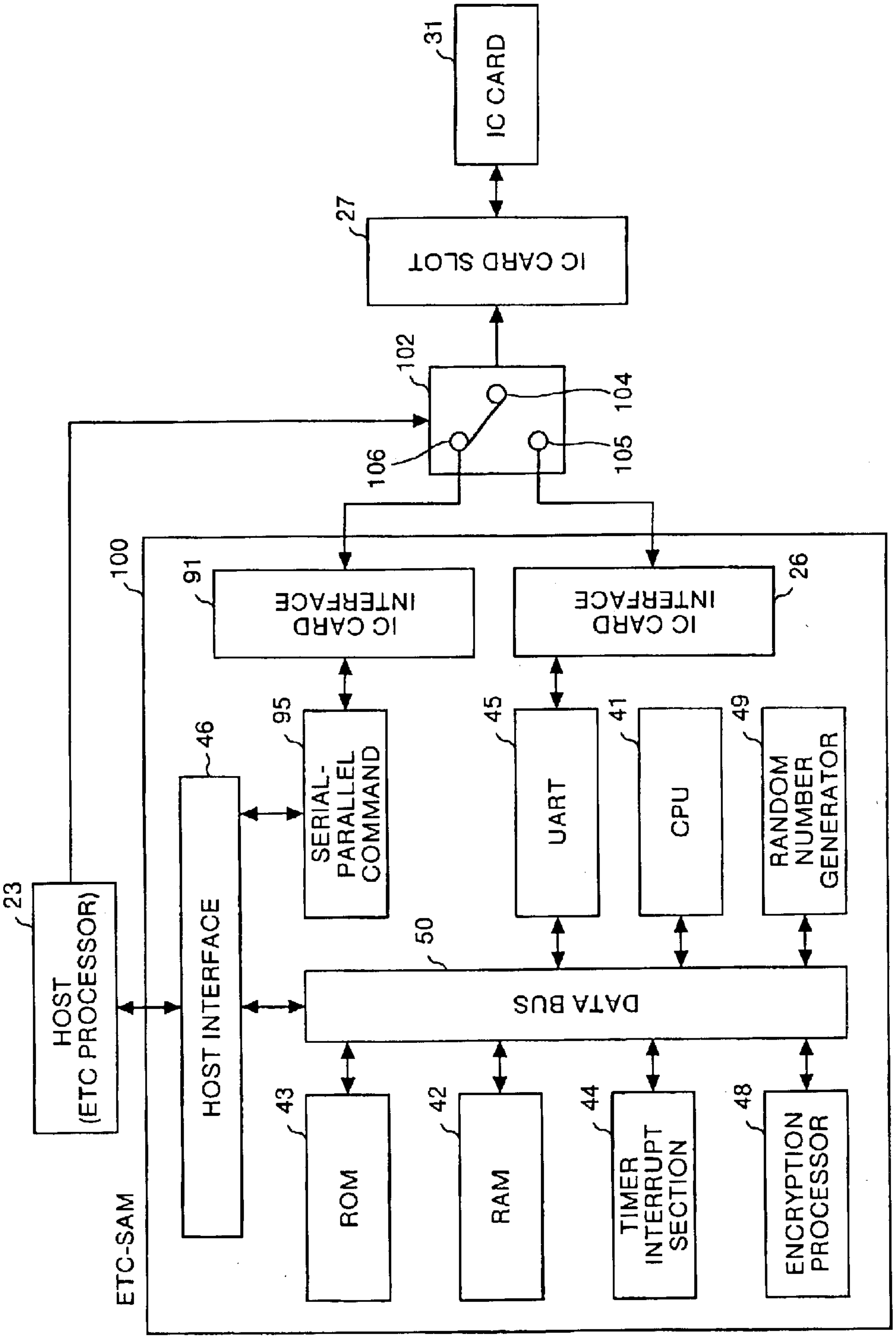
FIG. 10 is a block diagram showing a configuration example of an ETC-SAM according to a sixth embodiment of this invention.

FIG. 10 is a block diagram showing a configuration example of an ETC-SAM 100 according to the sixth embodiment. The configuration is such that a switch 102 is further provided in the ETC-SAM 90 shown in FIG. 9 so as to switch the connection between the IC card slot 27 and the IC card interfaces 26 and 91. The other parts of the configuration are the same as those of FIG. 9, and the same reference numerals are assigned to the same parts.

In FIG. 10, the IC card slot 27 is connected to a first terminal 104 of the added switch 102, the IC card interface 26 is connected to a second terminal 105, and the IC card interface 91 is connected to a third terminal 106.

After the IC card 31 is activated in accordance with the procedure described in detail in the fourth embodiment, the HOST 23 judges whether the function of the ETC-SAM 100 is to be used, and outputs a control signal to the switch 102. When the function of the ETC-SAM 100 is to be used, the first terminal 104 and the second terminal 105 of the switch 102 are connected, to thereby use the function of the ETC-SAM 100. The detailed operation in this case is the same as that described in the first embodiment, and hence the explanation thereof is omitted.

When the function of the ETC-SAM 100 is not to be used, the first terminal 104 and the third terminal 106 of the switch 102 are connected to allow direct communication with the HOST 23 via the serial-parallel conversion circuit 95, without using the function of the ETC-SAM 100.

As described above, according to the sixth embodiment, there are provided the IC card interface 91 for communication between the HOST 23 and the IC card 31, the switch 102 having the first terminal 104 connected with the IC card slot 27, the second terminal 105 connected with the first IC card interface 26, and the third terminal 106 connected with the second IC card interface 91. There are also provided the serial-parallel conversion circuit 95 that is connected between the second IC card interface 91 and the HOST interface 46 for converting the signal form of a communication signal between the second IC card interface 91 and the HOST interface 46. The ETC processing unit controls such that the IC card slot 27 and the first IC card interface 26 are connected when the function of the ETC-SAM 100 is used and the IC card slot 27 and the second IC card interface 91 are connected when the function of the ETC-SAM 100 is not used. Therefore, the chip of the ETC-SAM 100 can be used for a plurality of applications other than the ETC system, and therefore an application-independent DSRC system can be realized, and the market of the vehicle-onboard DSRC apparatus based on the vehicle-onboard ETC device can be expanded.

Further, according to the sixth embodiment, an application-independent vehicle-onboard DSRC apparatus can be realized by adding a unit having a simple configuration, and therefore the market expansion of the vehicle-onboard DSRC apparatus based on the vehicle-onboard ETC device can be realized more economically.

A seventh embodiment of this invention will be explained below.

Figure 11:
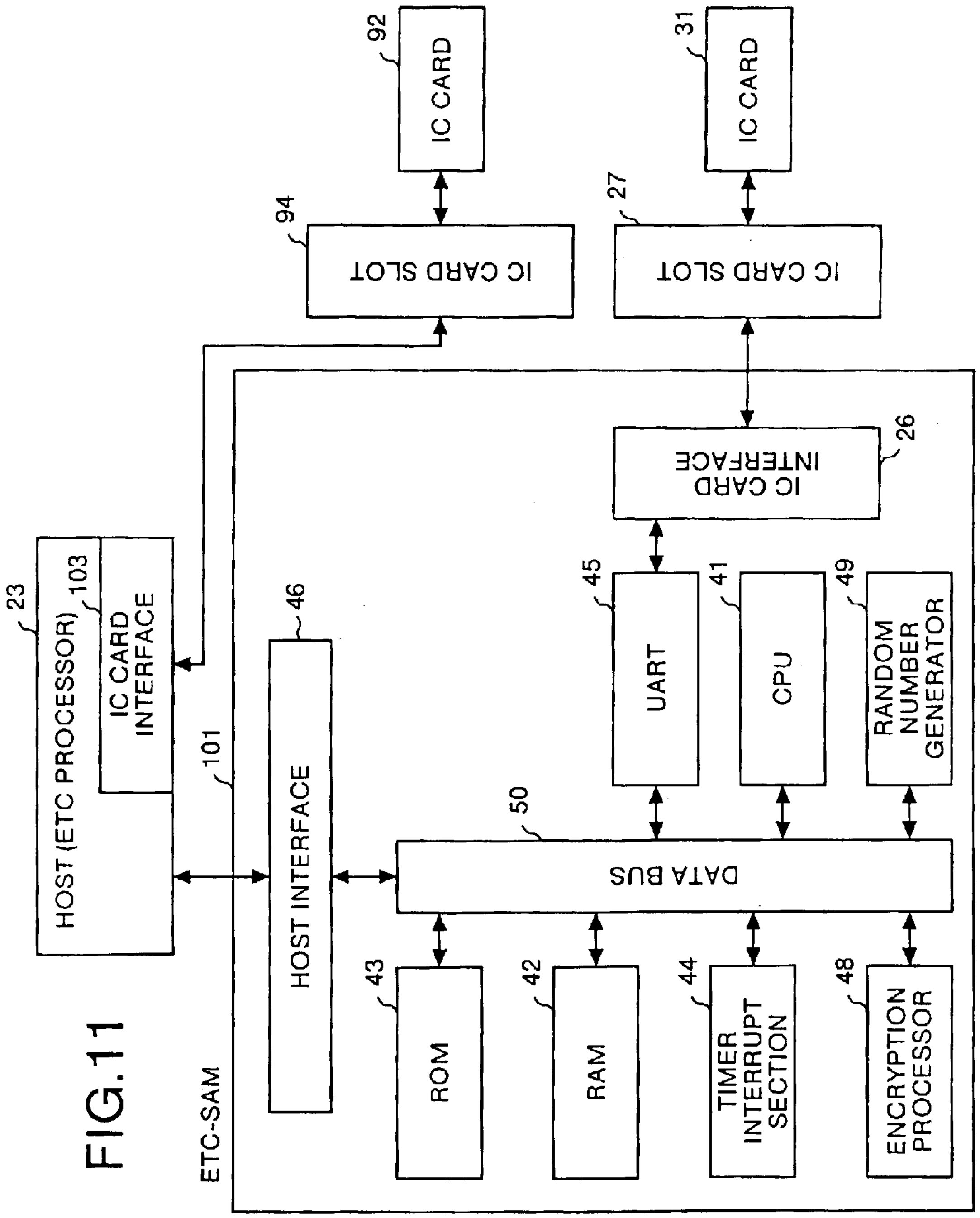
FIG. 11 is a block diagram showing a configuration example of an ETC-SAM according to a seventh embodiment of this invention.

FIG. 11 is a block diagram showing a configuration example of an ETC-SAM 101 according to the seventh embodiment. The configuration is such that an IC card interface 103 connected with the second IC card slot 94 is provided in the HOST 23 in the ETC-SAM 90 shown in FIG. 9. The other parts of the configuration are the same as those of FIG. 9, and the same reference numerals are assigned to the same parts.

In FIG. 11, the IC card slot 94 into which the IC card 92 is inserted can communicate with the HOST 23 through the IC card interface 103 provided in the HOST 23. As in the fifth embodiment, the mode of the ETC-SAM 101 is determined by identifying the IC card slot to be used by the entry command from the HOST 23. The detailed operation is the same as that described in detail in the fifth embodiment, and hence explanation thereof is omitted.

According to the seventh embodiment, the second IC card interface 103 for communicating with the IC card 92 is provided in the HOST 23, and is connected with the second IC card slot 94 into which the second IC card 92 is inserted. Thereby the chip of this ETC-SAM 101 can be used for a plurality of applications other than the ETC system. As a result, an application-independent DSRC system can be realized, and the market of the vehicle-onboard DSRC apparatus based on the vehicle-onboard ETC device can be expanded.

Further, according to the seventh embodiment, an application-independent vehicle-onboard DSRC apparatus can be constructed by adding a unit having a simple configuration, and therefore the market expansion of the vehicle-onboard DSRC apparatus based on the vehicle-onboard ETC device can be realized more economically.

An eighth embodiment of this invention will be explained below.

Figure 12:
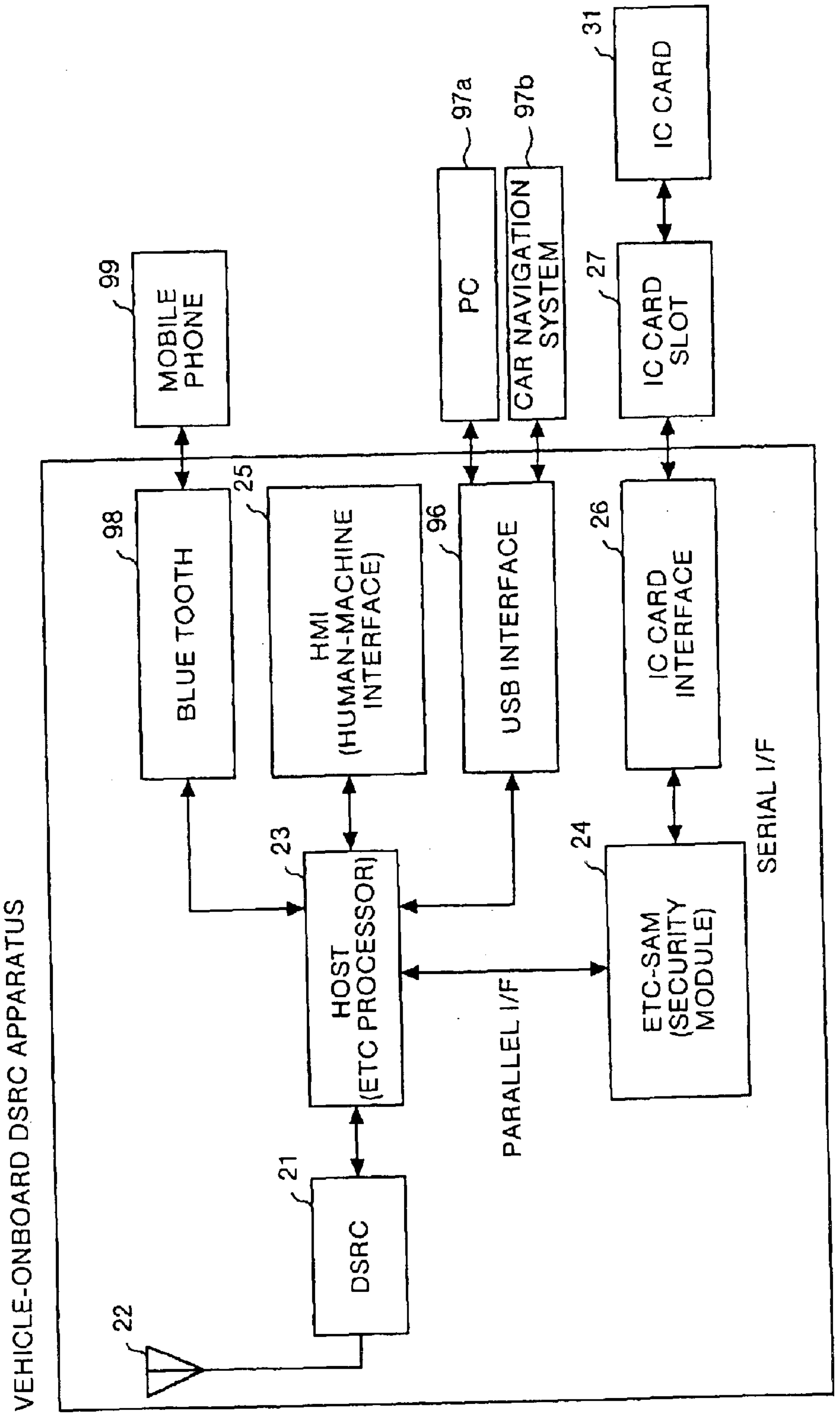
FIG. 12 is a block diagram showing a configuration example of a vehicle-onboard DSRC apparatus according to an eighth embodiment of this invention.
Figure 13:
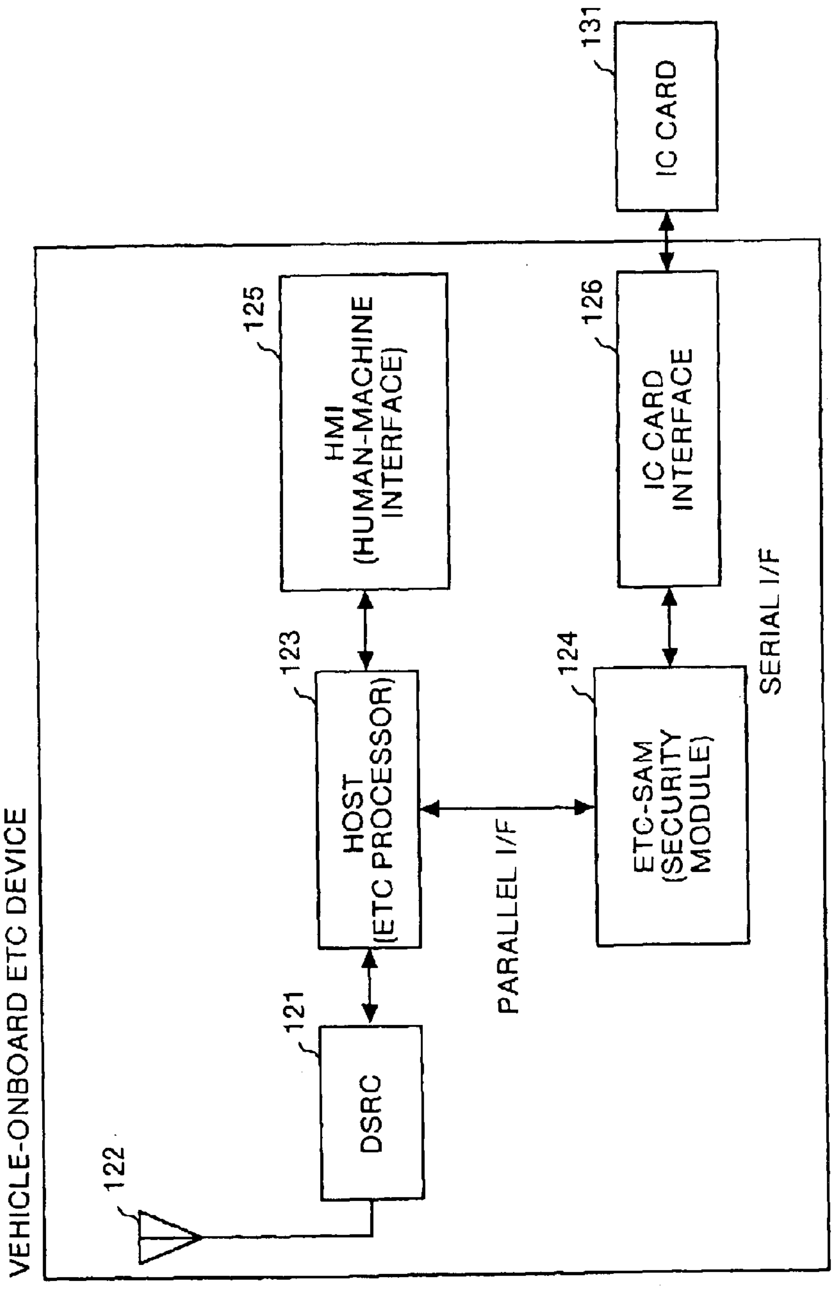
FIG.13 BACKGROUND ART
FIG. 13 is a block diagram showing a configuration example of a vehicle-onboard ETC device mounted on a vehicle side of an ETC system, being one of the DSRC systems according to the conventional art.
Figure 14:
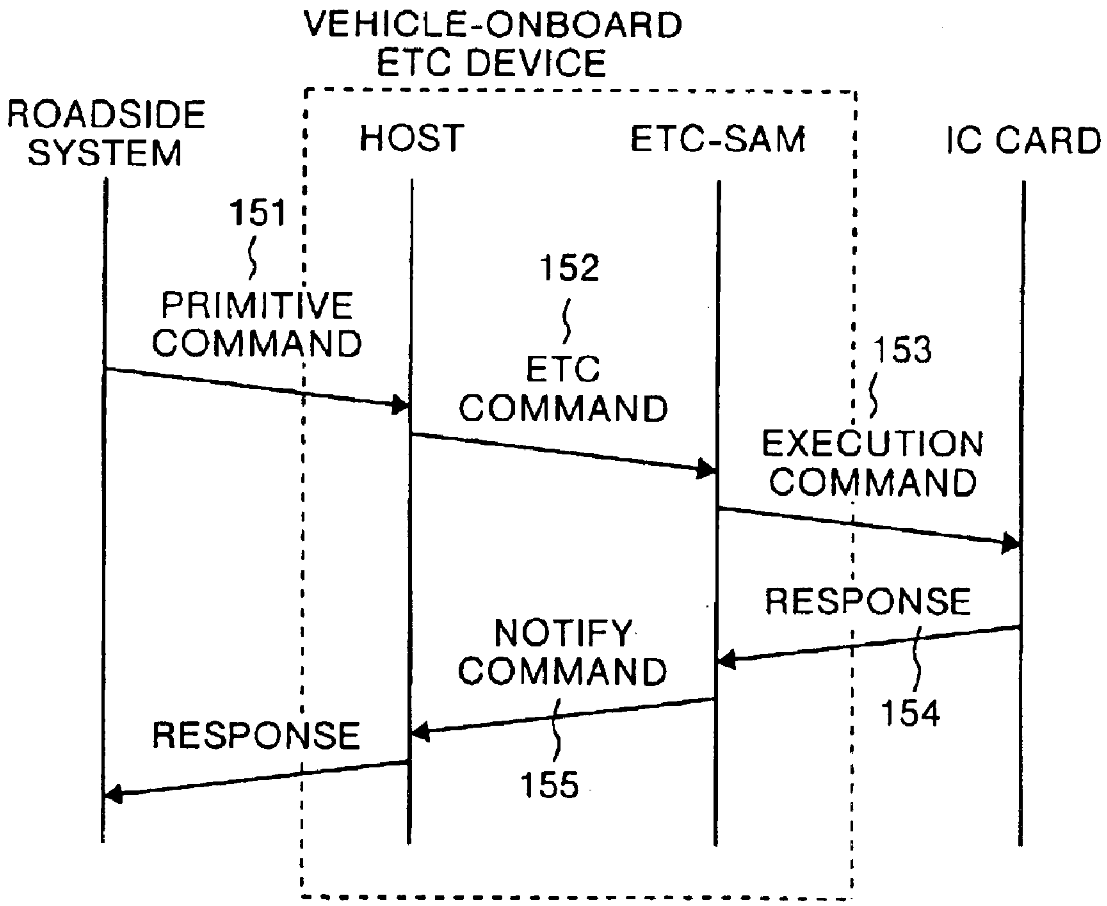
FIG.14 BACKGROUND ART
FIG. 14 is a sequence diagram showing a command processing sequence between a roadside system, a vehicle-onboard ETC device, and an IC card according to the conventional art.
Figure 15:
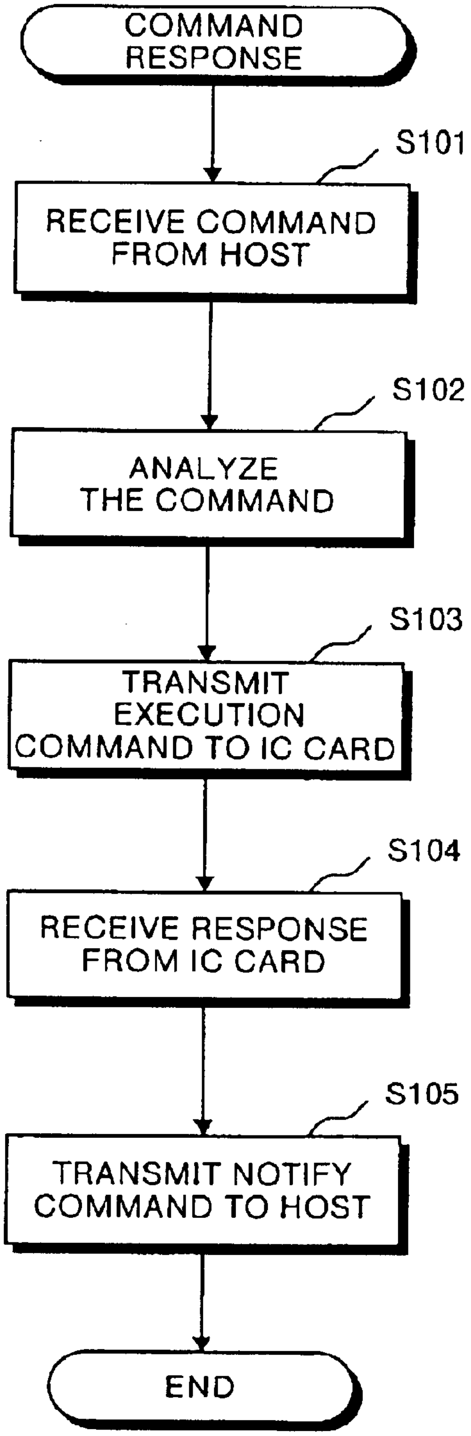
FIG.15 BACKGROUND ART
FIG. 15 is a flowchart showing a sequence of a command response by the ETC-SAM according to the conventional art.

FIG. 12 is a block diagram showing a configuration example of a vehicle-onboard DSRC apparatus according to the eighth embodiment. The configuration is such that a Blue Tooth Interface 98 for communicating with a mobile phone 99, and an USB interface 96 for communicating with a PC 97*a* and a car navigation system 97*b* are provided in the vehicle-onboard DSRC apparatus in FIG. 1. The other parts of the configuration are the same as those of FIG. 1, and the same reference numerals are assigned to the same parts.

The Blue Tooth stands for a standard open to the public, for the leading technology that realizes the wireless communication of speech and data in a relatively narrow range between a mobile phone, a personal digital assistant, a printer, a scanner, a digital camera, and even household electric appliances.

As shown in FIG. 12, the added USB interface 96 and the Blue Tooth interface 98 are directly connected to the HOST 23 without using the ETC-SAM 24.

According to the eighth embodiment, the USB interface 96 and the Blue Tooth interface 98 are provided in the vehicle-onboard DSRC apparatus, thereby enabling connection to the PC 97*a*, connection to the car navigation system 97*b*, and communication with the mobile phones 99. As a result, the market of the vehicle-onboard DSRC apparatus based on the vehicle-onboard ETC device can be expanded.

According to one aspect of the invention, the command judgment unit in the security processing unit judges the type of command included in a communication signal transmitted between the ETC processing unit and the IC card that holds user information, and the command control unit in the security processing unit controls whether this command is to be analyzed, according to the judgment result of the command judgment unit. Therefore, the communication procedure can be simplified, and the communication time can be shortened. As a result, it is advantageous that the application-independent DSRC system can be realized and market expansion of the vehicle-onboard DSRC apparatus based on the vehicle-onboard ETC device can be realized more economically.

Moreover, the command judgment unit judges whether the command included in the communication signal transmitted between the ETC processing unit and the IC card is an ETC command, and the command control unit transmits an execution command obtained by analyzing the ETC command to the IC card, when the command judged by the command judgment unit is the ETC command. On the other hand, when the command judged by the command judgment unit is an undefined command, which is not the ETC command, the command control unit transmits this undefined command to the IC card without analyzing it. Therefore, the communication procedure can be simplified, and the communication time can be shortened. As a result, it is advantageous that the application-independent DSRC system can be realized and market expansion of the vehicle-onboard DSRC apparatus based on the vehicle-onboard ETC device can be realized more economically.

Furthermore, a plurality of modes, that is, an ETC mode and a non-ETC mode are provided. In the ETC mode, a command included in a communication signal transmitted from the ETC processing unit is analyzed, to thereby perform encryption/decryption of the ETC data included in the communication signal transmitted between the ETC processing unit and the IC card that holds user information. In the non-ETC mode, when it is judged that the command included in the communication signal transmitted from the ETC processing unit is an undefined command, which is not the ETC command, this undefined command is transmitted to the IC card without being analyzed. Since the mode setting unit in the security processing unit is constructed so as to set the modes based on a mode entry command transmitted from the ETC processing unit, the communication procedure can be simplified, and the communication time can be shortened. As a result, it is advantageous that the application-independent DSRC system can be realized and market expansion of the vehicle-onboard DSRC apparatus based on the vehicle-onboard ETC device can be realized more economically.

Moreover, in the encryption/decryption mode of the non-ETC mode, upon reception of an encryption/decryption request of data from the ETC processing unit, the security processing unit performs encryption/decryption of the data, and transmits the encrypted data/decrypted data of the data to the ETC processing unit. In the serial-parallel conversion mode of the non-ETC mode, the signal form of the data is converted for the data communication between the ETC processing unit and the IC card. As a result, it is advantageous that the application-independent DSRC system can be realized and market expansion of the vehicle-onboard DSRC apparatus based on the vehicle-onboard ETC device can be realized more economically.

Furthermore, the ETC processing unit identifies the application based on a frequency band used in the DSRC, and the mode setting unit in the security processing unit sets any one of the ETC mode, the encryption/decryption mode, and the serial-parallel conversion mode, when the application identified according to the mode entry command transmitted from the ETC processing unit is executed. Therefore, the communication procedure can be simplified, and the communication time can be shortened. As a result, it is advantageous that the application-independent DSRC system can be realized and market expansion of the vehicle-onboard DSRC apparatus based on the vehicle-onboard ETC device can be realized more economically.

Moreover, the IC card activation detecting unit in the security processing unit detects whether the IC card is activated, the ETC processing unit identifies the IC card based on an IC card activation signal transmitted from the IC card activation detecting unit, and the mode setting unit in the security processing unit sets any one of the ETC mode, the encryption/decryption mode, and the serial-parallel conversion mode, when the processing with respect to the IC card identified according to a mode entry command transmitted from the ETC processing unit is executed. Therefore, the communication procedure can be simplified, and the communication time can be shortened. As a result, it is advantageous that the application-independent DSRC system can be realized and market expansion of the vehicle-onboard DSRC apparatus based on the vehicle-onboard ETC device can be realized more economically.

According to another aspect of this invention, the signal conversion unit in the security module is connected between the second IC card interface for communication between the ETC processing unit and the second IC card inserted into the second IC card slot, and converts the signal form of a communication signal between the second IC card interface and the host interface. Therefore, the communication procedure can be simplified, and the communication time can be shortened. As a result, it is advantageous that the application-independent DSRC system can be realized and market expansion of the vehicle-onboard DSRC apparatus based on the vehicle-onboard ETC device can be realized more economically.

Furthermore, a plurality of second IC card slots and a plurality of second IC card interfaces are provided, and the second IC card interfaces are respectively connected to the signal conversion unit. The signal form of the communication signal is converted between the second IC card interfaces and the host interface. Therefore, the communication procedure can be simplified, and the communication time can be shortened. As a result, it is advantageous that the application-independent DSRC system can be realized and market expansion of the vehicle-onboard DSRC apparatus based on the vehicle-onboard ETC device can be realized more economically.

According to still another aspect of this invention, the signal conversion unit in the security module is connected between the second IC card interface, which performs communication between the ETC processing unit and the IC card, and the host interface to convert the signal mode of a communication signal between the second IC card interface and the host interface. A switch is further provided, and this switch switches the IC card slot to either the first IC card interface or the second IC card interface, under control of the ETC processing unit. Therefore, the communication procedure can be simplified, and the communication time can be shortened. As a result, it is advantageous that the application-independent DSRC system can be realized and market expansion of the vehicle-onboard DSRC apparatus based on the vehicle-onboard ETC device can be realized more economically.

According to still another aspect of this invention, the second IC card interface is provided in the ETC processing unit, so that the second IC card interface communicates with the second IC card inserted into the second IC card slot. Therefore, the communication procedure can be simplified, and the communication time can be shortened. As a result, it is advantageous that the application-independent DSRC system can be realized and market expansion of the vehicle-onboard DSRC apparatus based on the vehicle-onboard ETC device can be realized more economically.

Furthermore, the general-purpose equipment communicates with the ETC processing unit via the USB interface and/or the Blue Tooth interface, thereby enabling connection to a PC, connection to a car navigation system, and communication with mobile phones. As a result, it is advantageous that market expansion of the vehicle-onboard DSRC apparatus based on the vehicle-onboard ETC device can be realized.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A vehicle-onboard dedicated short-range communication (DSRC) apparatus comprising:

a DSRC processing unit that processes a radio communication signal transmitted by DSRC;

an electronic toll collection (ETC) processing unit that performs transactions of an ETC command and ETC data included in the radio communication signal communicated with the DSRC processing unit; and a security module including a security processing unit including an encryption/decryption unit for performing encryption/decryption of the ETC data included in a communication signal transmitted between the ETC processing unit and an IC card with user information held therein, a host interface for communication between the security processing unit and the ETC processing unit, and an IC card interface for communication between the security processing unit and the IC card, wherein the security processing unit further includes:

a command judgment unit for judging a type of command included in a communication signal transmitted between the ETC processing unit and the IC card, and a command control unit for controlling whether the command is to be analyzed, according to a result of judgment by the command judgment units wherein the command judgment unit judges whether the command included in the communication signal transmitted between the ETC processing unit and the IC card is an ETC command; and the command control unit transmits an execution command obtained by analyzing the ETC command to the IC card when the command judged by the command judgment unit is the ETC command, and when the command judged by the command judgment unit is an undefined command that is not the ETC command, transmits the undefined command to the IC card without being analyzed.

2. The vehicle-onboard DSRC apparatus according to claim 1, wherein the security processing unit further includes a mode setting unit for setting a plurality of modes based on a mode entry command transmitted from the ETC processing unit, wherein the modes includes an ETC mode in which a command included in a communication signal transmitted from the ETC processing unit is analyzed to perform encryption/decryption of the ETC data included in the communication signal transmitted between the ETC processing unit and the IC card with user information held therein, and a non-ETC mode in which when it is judged that the command included in a communication signal transmitted from the ETC processing unit is an undefined command that is not the ETC command, the undefined command is transmitted to the IC card without being analyzed.

3. The vehicle-onboard DSRC apparatus according to claim 2, wherein the non-ETC mode includes an encryption/decryption mode in which upon reception of an encryption/decryption request of data from the ETC processing unit, the security processing unit performs encryption/decryption of the data, and transmits encrypted data/decrypted data of the data to the ETC processing unit, and a serial-parallel conversion mode in which a signal form of the data is converted for the data communication performed between the ETC processing unit and the IC card.

4. The vehicle-onboard DSRC apparatus according to claim 3, wherein the ETC processing unit identifies an application based on a frequency band used in the DSRC, and the mode setting unit sets any one of the ETC mode, the encryption/decryption mode, and the serial-parallel conversion mode to execute the application identified according to the mode entry command transmitted from the ETC processing unit.

5. The vehicle-onboard DSRC apparatus according to claim 3, wherein the security processing unit further includes an IC card activation detecting unit for detecting whether the IC card is activated, the ETC processing unit identifies the IC card based on an IC card activation signal transmitted from the IC card activation detecting unit, and the mode setting unit sets any one of the ETC mode, the encryption/decryption mode, and the serial-parallel conversion mode to execute the processing to the IC card identified according to the mode entry command transmitted from the ETC processing unit.

6. The vehicle-onboard DSRC apparatus according to claim 1, further comprising either one of or both of a USB interface and a Blue Tooth interface for communication with general-purpose equipment.

* * * * *